United States Patent [19]

Acker et al.

[11] 4,282,465

[45] Aug. 4, 1981

[54] VEHICLE CONTROL SYSTEM

[75] Inventors: Frank E. Acker, Forest Hills; Charles D. Rogers, Monroeville, both of Pa.

[73] Assignee: United States Steel Corporation, Pittsburgh, Pa.

[21] Appl. No.: 159,544

[22] Filed: Jun. 16, 1980

Related U.S. Application Data

[63] Continuation-in-part of Ser. No. 874,079, Feb. 1, 1978, abandoned.

[51] Int. Cl.³ .............................................. H02P 5/06
[52] U.S. Cl. ..................................... 318/139; 318/341
[58] Field of Search .............. 318/139, 256, 257, 268, 318/341, 345

[56] References Cited

U.S. PATENT DOCUMENTS

| 3,280,397 | 10/1966 | Bruns | 318/139 |
|---|---|---|---|
| 3,428,880 | 2/1969 | Muller | 318/257 |
| 3,549,966 | 12/1970 | Wilson | 318/135 |
| 3,808,481 | 4/1974 | Rippel | 318/139 |
| 3,890,549 | 6/1975 | Konrad | 318/246 |
| 4,090,115 | 5/1978 | Franz, Jr. | 318/139 X |

Primary Examiner—J. V. Truhe
Assistant Examiner—W. E. Duncanson, Jr.
Attorney, Agent, or Firm—Rea C. Helm

[57] ABSTRACT

A control system for an electrically powered vehicle has thyristors acting as choppers and switches in its power circuit. An on-board digital computer provides gating pulses to the thyristors to control traction and auxiliary motors in accordance with programs responding to operator, circuit and vehicle condition signals. The programs provide for vehicle start-up, shutdown, regular operation, limited operation and maintenance.

21 Claims, 5 Drawing Figures

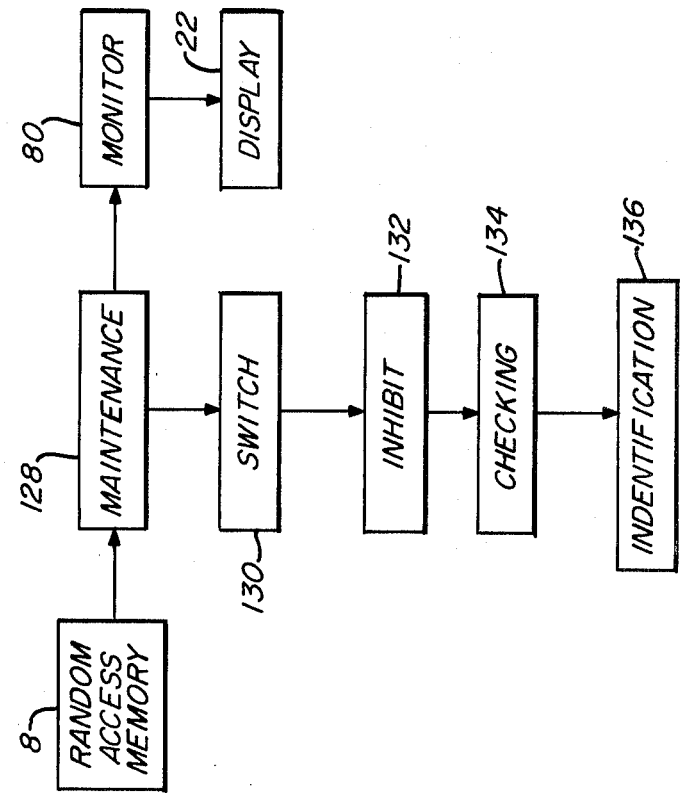
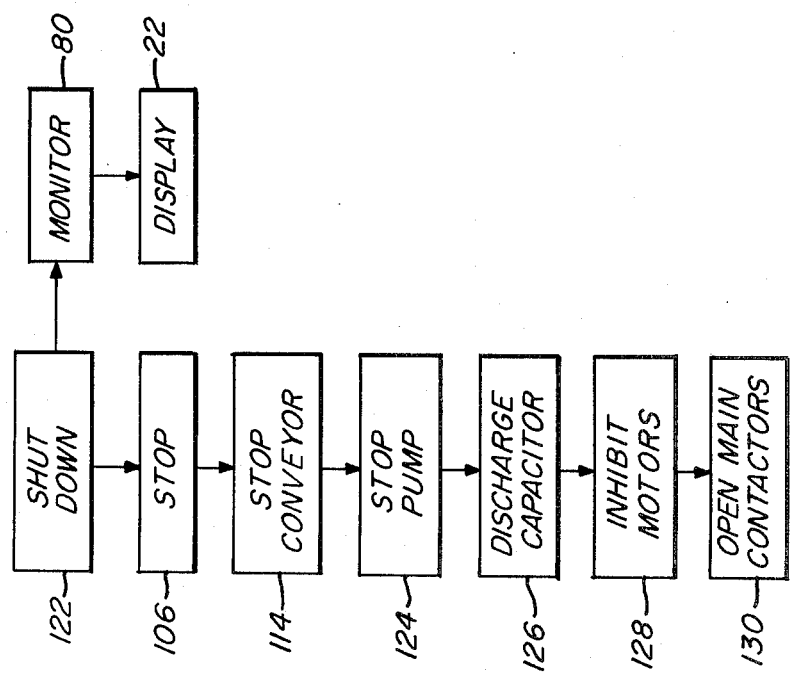

VEHICLE CONTROL SYSTEM

SUMMARY OF THE INVENTION

This application is a continuation-in-part of our earlier application Ser. No. 874,079 filed Feb. 1, 1978 now abandoned.

This invention relates to a control system for traction equipment and more particularly to a control system for a mine shuttle car using thyristors in the electrical circuit controlling the traction motors and auxiliary motors.

Direct current series motors are commonly used as traction motors for mine shuttle cars because of inherent desirable torque speed characteristics. Conventional contactor type electric controllers for such motors create maintenance problems on wheel drives and gear trains as controllers are stepped through speed points, each step jarring the drive system.

Controllers with silicon controlled rectifiers (SCR) have reduced mechanical wheel drive problems, but such controllers are inflexible and difficult to maintain. Such controllers include a gating or firing circuit, a quantity of electrical and electronic components wired together to carry out varied arithmetic and logic functions. This hard-wired apparatus normally requires considerable time for troubleshooting in maintenance and repair work and requires replacement of fixed value components with each redesign of power regulator operation. For example, a change in action or power requirements of an electric motor drive system would require changes in the fixed components in the gating circuit apparatus associated with the SCR power control regulator for the motor. It is impractical to design and construct a gating circuit by conventional methods that is universally applicable to a given class of regulators which includes an off line/on line controller with self diagnostic capability and reprogramable capability.

In accordance with one application of our invention, a direct current powered mine shuttle car with silicon controlled rectifiers in the power control system has a plurality of voltage, current, condition, position, speed and temperature sensors to provide inputs to an on-board microcomputer. The microcomputer continuously cycles through a normal operating program, monitoring the inputs and, on the basis of the inputs and the program instructions, provides a plurality of outputs. The outputs include gate pulses to specific SCRs at specific times, indications of a plurality of conditions with respect to the shuttle car, the controller and the power system and gate pulses to an SCR choppered direct current power motor regulator. Upon the occurrence of selected input conditions, the normal operating program is changed to a diagnostic maintenance program, or a crippled operation program, or further operation may be inhibited. Selected inputs are temporarily stored for use in a maintenance program which is used for troubleshooting when the vehicle is not operating.

DESCRIPTION OF THE DRAWINGS

FIG. 4 is a block diagram of the shut-down procedures, and FIG. 5 is a block diagram of the maintenance procedures.

DETAILED DESCRIPTION

Figure 1:
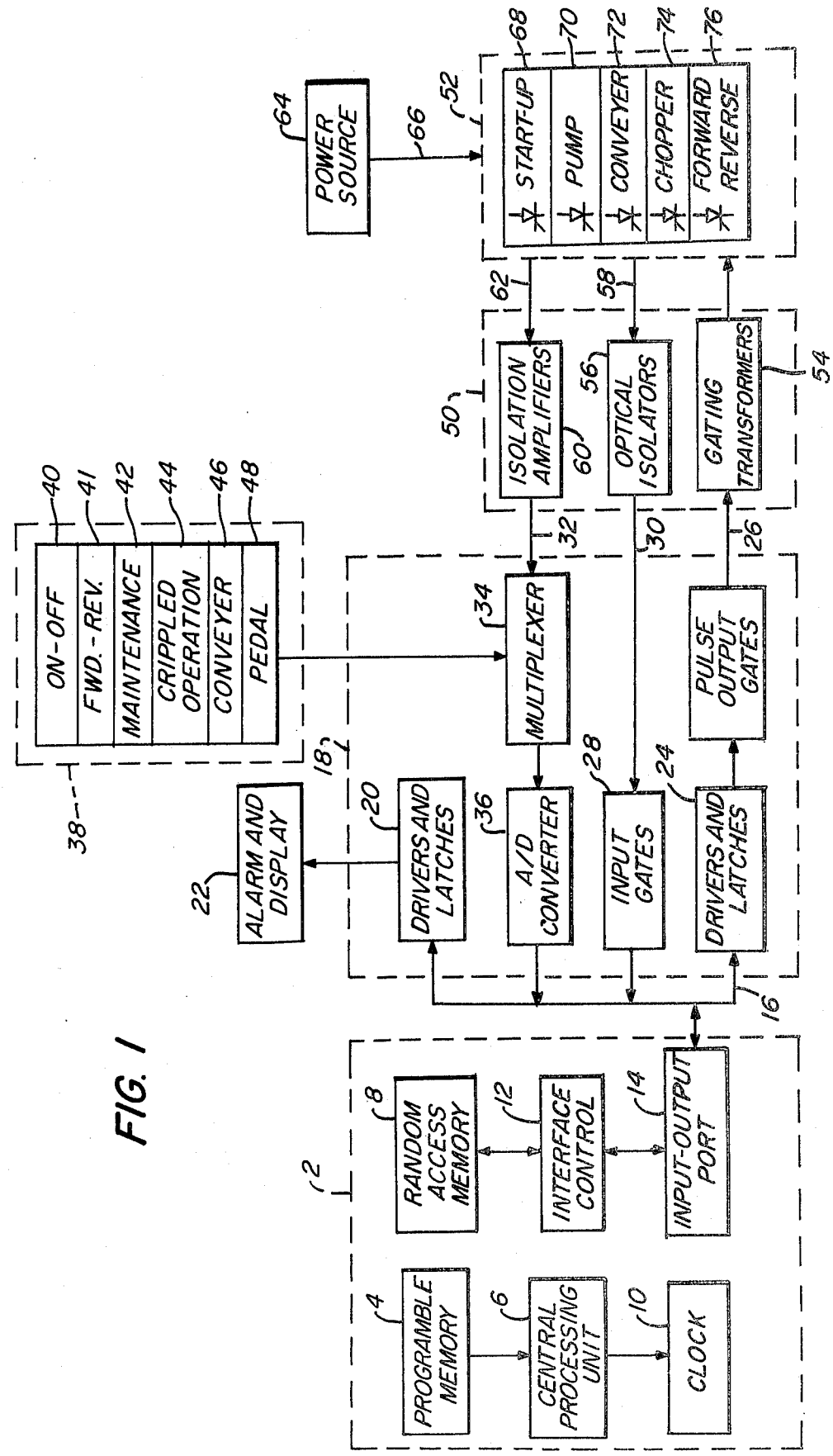
FIG. 1 is a block schematic diagram of the control and power circuit of the invention.

Referring now to FIG. 1, reference numeral 2 refers to a microcomputer module mounted on a mine shuttle car. The microcomputer includes a programable memory 4, a central processing unit such as a microprocessor 6, a random access memory 8, a digital clock 10, an interface control 12 and an input-output port 14. An interconnection 16 connects the microcomputer to an input-output module 18.

Module 18 has a first series of drivers and latches 20 connected to an alarm and display unit 22 for displaying signals received from the computer 2. Module 18 has a second set of drivers and latches 24 for providing pulse outputs 26 responsive to outputs from computer 2. Module 18 has a plurality of input gates 28 for providing a plurality of input signals to computer 2 from a first signal source 30. A second source of input signals 32 is connected to a multiplexer 34 in module 18. Multiplexer 34 is connected to an analog-to-digital converter 36. A source of operator initiated signals 38 is also connected to multiplexer 34. Signal source 38 includes signals representative of the position of an on-off switch 40, a forward-reverse selector switch 41, the position of maintenance switch 42, the position of crippled operation switch 44, the position of a conveyor switch 46, and the position of a foot pedal 48.

A signal conditioning module 50 is mounted on the shuttle car with microcomputer 2 and the input-output module 18 and is connected between module 18 and a shuttle car power circuit 52. Module 50 has a plurality of gating transformers 54, one for each SCR in circuit 52, which pass pulse outputs 26 to each individual SCR in the power circuit 52. Module 50 has a plurality of optical isolators 56 which receive a plurality of SCR condition signals 58 from the SCRs in circuit 52 and provides signal source 30. Module 50 has a plurality of isolation amplifiers 60 which receive a plurality of circuit condition signals 62 (current, voltage, temperature, speed) from circuit 52 and provides signal source 32.

A direct current power source 64 is connected to circuit 52 by a trailing cable 66. Shuttle car power circuit 52 includes a start-up module 68, a pump module 70, a conveyor module 72, a chopper module 74 and a forward-reverse module 76. Each of the modules in circuit 52 has one or more SCRs which receive gating pulses from pulse output 26 and have sensors detecting the conduction status of each SCR providing outputs 58.

To operate the shuttle car, the operator first turns on switch 40 to the ON position. This activates computer 2, resetting memory 8 and enables computer 2 to receive a variety of inputs and to provide outputs as programmed in programable memory 4. A voltage sensor for each SCR in circuit 52 provides signals 58 to indicate the conduction status of each SCR. These signals are converted to digital values and stored in memory 8 for future processing as a first group of inputs to computer 2. A second group of inputs to computer 2 is the circuit condition signals 62, which includes a group of sensors providing signals representative of armature current for each motor, voltage across motor armature, armature speed, temperature of specific components, and voltages and currents at specific locations in circuit 52 selected for programmed circuit diagnostic analysis.

Signals 62 are converted to digital values and stored in memory 8. A third group of inputs to computer 2 is the operator initiated signals 38 which include a group of sensors indicating the position the operator has placed each switch and a voltage signal indicating the speed pedal position. These signals are converted to digital values and stored in memory 8. A first group of outputs of computer 2 is a plurality of pulse trains, one for each SCR in circuit 52 to drivers 24. Outputs from drivers 24 are applied to the gating transformers 54 that provide gate pulses to individual SCRs in circuit 52. A second group of outputs of computer 2 is connected to the series of drivers 20 which provide a plurality of vehicle and circuit indications to display unit 22.

Figure 2:
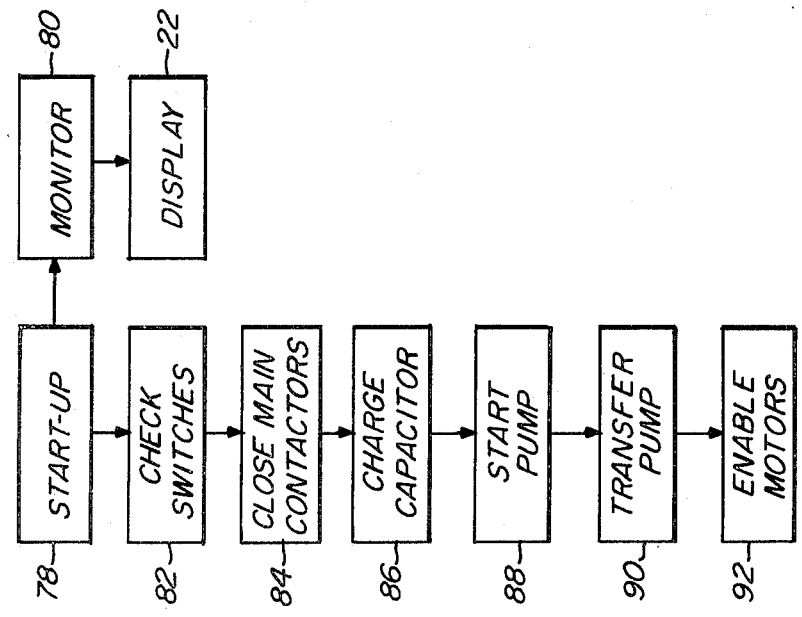
FIG. 2 is a block diagram of the start-up procedure.

The closing of switch 40 starts computer 2 on the startup procedure 78 of FIG. 2. While the steps in start-up procedure are being performed, the computer simultaneously begins the continuous cyclical monitoring 80 of all the inputs, determining if the input is within its expected range or on-off status and, if not within its expected range or on-off status for the existing conditions, indicating an appropriate alarm on display 22. The alarm is preferably a light emitting diode numerical display indicating the module with the off-normal condition and the nature of the off-normal condition. Several cycles of monitored values are stored in memory 8. In addition to the display of off-normal condition, if the off-normal condition is critical, continued operation may be partially or completely inhibited.

Once monitoring has begun, the first step in the start-up procedure is to check, 82, for proper position of switches 42 and 44 and begin a series of electrical control commands. The main power contactors are turned on, 84, in circuit 52. This begins charging, 86, a line filter capacitor in circuit 68 with the charging current limited by a resistor applied with a small pilot contactor. The motor driving the vehicle hydraulic pump in circuit 70 is started, 88, by connecting the pump motor to the power line through an SCR acting as a chopper in circuit 74. The gating circuit of the chopper SCR is controlled according to a current limiting starting program stored in memory 4. When the pump motor has reached full speed so that the brakes, steering and other vehicle auxiliaries served by the hydraulic system can now be used, the connection of the pump motor is transferred, 90, from the chopper SCR to the line for normal operation. When the transfer has been made, the program enables, 92, the traction motor to respond to operator initiated signals 38 in accordance with the signals and the appropriate program steps, placing the vehicle in the operate procedure, 94, of FIG. 3. Chopper circuit 74 is connected to the drive motors in circuit 52.

Figure 3:
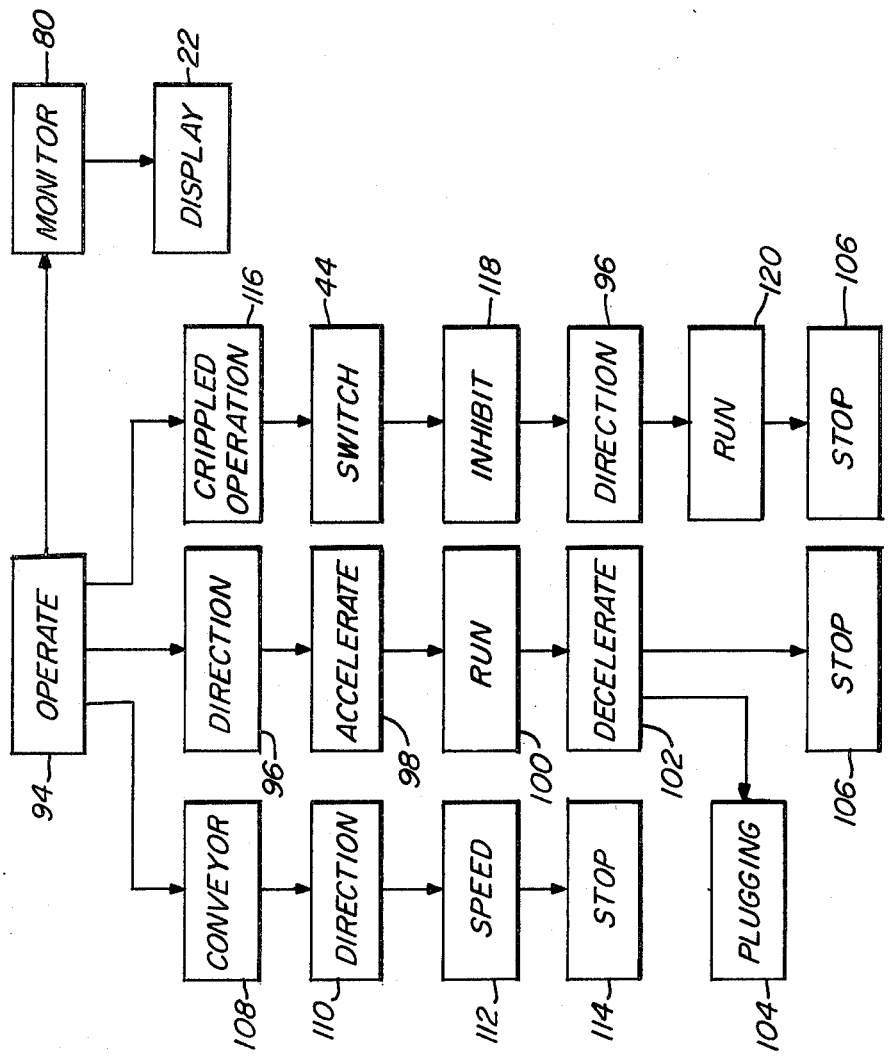
FIG. 3 is a block diagram of the operating procedures.

When in the operate procedure, FIG. 3, the monitor function, 80, together with the display 22, continues as during the start-up procedure. For example, the operation of the traction motors is inhibited unless the pump is functioning as desired. Depending on the position of switch 41, the appropriate gating signal, 96, is provided reverser SCRs in circuit 76 steering the current through the series motor field, or fields, with multiple traction motors, in either a positive or negative sense to control direction of motor torque. As the operator advances the speed control, 48, the computer provides an accelerate program 98, a pulse train to the chopper circuit 74 calculated within the limits of current limitations, speed limitations and a desired torque-speed characteristic. Once the desired speed is reached, the computer maintains, 100, the pulse rate. When the operator signals a reduction in speed by pedal 48, the computer reduces, 102, the pulse rate accordingly. If the operator reverses direction control 41 while the car is still in motion, the computer then provides plugging routine, 104, which includes a time delay while chopper 74 reduces armature current to zero when reverser circuit 76 reverses direction of field current, and chopper 74 reapplies power, under a current limitation, to slow and reverse the shuttle car as rapidly as possible. When the operator applies the brakes or releases the pedal, the computer provides a stop routine 106, turning off chopper 74.

When the operator desires to operate the conveyor on the shuttle car, the operator starts the program by switch 46. This starts the computer on the conveyor routine 108. The monitoring function 80 continues. The computer inhibits operation of the traction motors while operating the conveyor. The direction of conveyor operation, 110, is established by position of switch 46 with the computer providing the appropriate gating pulses to reverser SCRs in circuit 72. Chopper circuit 74 is disconnected from the traction motors and connected to the conveyor motors and the conveyor operated according to a speed program 112. The conveyor is stopped by the operator moving switch 46 and the computer, in a stop routine 114, disconnects chopper circuit 74 from the conveyor motor, and connects circuit 74 to operate on the traction motors.

The monitoring process may indicate an off-normal condition serious enough for the computer to inhibit further operation of the shuttle car. However, in such an event, further operation may be required to move the vehicle out of the line of production to minimize interference with mining, to unload and to move the vehicle to a location where repairs can be made. In this case, the vehicle may be operated according to a crippled operation routine, 116. The operator is advised by display 22 that off-normal conditions inhibit further operation of the shuttle car. The operator or maintenance man may then elect to move switch 44 to crippled operation. The crippled operation routine then inhibits, 118, further operation of the failed or inoperable components. For example, operation of only one of two traction motors may be inhibited, operation in forward direction may be inhibited or operation of the pump motor may be inhibited. The position of switch 41 provides the appropriate gating signals 96 to circuit 76, and the position of pedal 48 starts the crippled operation routine 120 using circuit 74 to move the vehicle. When the operator releases the pedal or applies the brakes, the computer initiates the stop routine 106.

When the operator decides to stop the operation of the shuttle car, he initiates the shutdown procedure 122, FIG. 4, by positioning switch 40 to the "off" position. During this procedure, the monitoring function, 80, is still being performed. The shutdown procedure initiates the stop procedure 106, if not already performed, followed by procedures to disconnect conveyor motor 114, if not already performed, and disconnects the pump motor 124. The filter capacitor in circuit 68 is discharged, 126. The traction motors are inhibited, 128, from further operation by turning off the SCRs in reverser circuit 76. Finally, the main contactors in circuit 52 are opened, 130. It is preferred to power computer 2 and input-output module 18 independent of power source 64 so that information in memory 8 may be preserved and used after shutdown.

Throughout all the operational procedures just described, computer 2 is always in total control of the shuttle car. For the purposes of service and repair, computer 2 has a maintenance routine 128 in FIG. 5, for use by a repairman when the shuttle car is not operating. The results of the monitoring function 80 are stored in memory 8 for each cycle, over a convenient number of cycles, and provide all the information required for a troubleshooting routine. Conditions within the shuttle car system are recorded before, during and after the occurrence of an off-normal condition or a fault. To initiate the maintenance routine, switch 42 is placed, 130, in the proper position. This inhibits operation of the shuttle car, 132, by preventing operation of the SCRs in circuit 52, except as a particular SCR is turned on as part of the checking routine 134. The checking routine selects values from signal sources 30, 32, 38 and memory 8 and from these values provides an identification, 136, of the off-normal condition. Most identifications may be explicit, indicating by modules the source of the problem. Other indications may identify the nature of the problem for the repairman. Examples of identification include failure of an individual module, low line voltage, overtemperature, failed motor brushes, stalled motor, ground faults as indicated by current imbalance between lines, ground fault in trailing cable, ground fault in a motor, blown fuse or an inoperative SCR.

While the preferred embodiment has been described with thyristors as the active components in circuits 68, 70, 72, 74 and 76, one or more of these electronic circuits may use other active components such as transistors. When the active component is not a thyristor gating transformer 54 is replaced by a gating driver circuit appropriate for the active component.

While the preferred embodiment of our invention has been described as applied to an underground shuttle car, the invention may be used on any electric powered vehicle with thyristor-control, as for example, a mine RAM-car, a mine scoop or a mine tractor, as well as a variety of surface vehicles. The same computer and the interfaces may be used in different vehicles, changing the programable memory to fit the requirements of a particular vehicle. The programable memory may, of course, be changed to fit changing requirements in the operation of a particular vehicle. The power circuit may receive power through a trolley system or from a battery as well as through a trailing cable.

The pump motor and the conveyor motor have been described as using the same chopper circuit as the traction motors. This is a matter of convenience, an additional chopper circuit could be used, and for certain types of auxiliary (other than traction) motors an additional chopper may be desirable.

The continuous monitoring of circuit and machine parameters permits rapid shutdown in case of a failure or abnormal condition, thus saving components from damage that would result if ordinary fault protection equipment alone were used. The monitoring also permits self-diagnosis of faults without the use of electrical test equipment and permits limited use of the vehicle by use of unaffected modules.

The electrical isolation combined with data reasonability tests in the monitoring performed by the computer results in a total control system that has a high immunity from electrical noise and electromagnetic interference.

We claim:

1. A control system for an electrically powered vehicle having a thyristor acting as a chopper in a power circuit connected between a power source and a traction motor comprising
   a digital computer mounted on the vehicle,
   a plurality of means mounted on the vehicle for providing operator initiated control signals to the computer,
   a plurality of means mounted on the vehicle for providing vehicle and power circuit condition signals to the computer,
   a random access memory in the computer for storing the operator initiated control signals and the vehicle and power circuit condition signals,
   a programable memory in the computer for programing the computer to cyclically compare the values of the stored signals with desired values and to store the comparisons in the random access memory, and
   means responsive to selected stored signals and selected comparisons operating within a program stored in the programable memory for providing gating pulses to the thyristor.

2. A system according to claim 1 which includes
   a first group of thyristors in the power circuit connected for controlling the direction of rotation of the traction motor upon selectively gating some of the thyristors of the group, and
   means responsive to selected stored signals and selected stored comparisons for providing gating pulses to selected thyristors of the first group.

3. A system according to claim 2 which includes means mounted on the vehicle for displaying the values of selected stored signals and selected stored comparisons.

4. A system according to claim 3 in which the display is a group of values for a single cycle and groups are displayed sequentially for a selected number of successive cycles.

5. A system according to claim 2 which includes
   an electric motor, in addition to a traction motor, mounted on the vehicle,
   a second group of thyristors in the power circuit connected to the electric motor, and
   means responsive to selected stored signals and selected stored comparisons for providing gating pulses to the second group of thyristors whereby the electric motor is connected to the power source through the chopper thyristor during startup.

6. A system according to claim 5 which includes
   an electric motor, connected to said power circuit, driving auxiliary equipment on the vehicle,
   a third group of thyristors in the power circuit connected to said motor, and
   means responsive to selected stored signals and selected comparisons for selectively providing gating pulses to the third group of thyristors for selectively turning said motor on, turning said motor off, accelerating said motor, decelerating said motor, and changing the direction of rotation of the motor.

7. A system according to claim 6 which includes
   a capacitor in the power circuit,
   a fourth group of thyristors connected to the capacitor, and
   means responsive to selected stored signals and selected stored comparisons for providing gating pulses to the fourth group of thyristors whereby the capacitor is charged upon occurrence of one selected stored signal and discharged upon the occurrence of another stored signal.

8. A system according to claim 7 which includes means mounted on the vehicle for displaying the values of selected stored signals and selected stored comparisons.

9. A system according to claim 8 in which the display is a group of values for a single cycle and groups are displayed sequentially for a selected number of successive cycles.

10. A system according to claim 9 which includes means connected to the computer and responsive to selected stored signals and selected comparisons for inhibiting the gating pulses to selected thyristors.

11. A Control system for an electrically powered vehicle having an electronic circuit acting as a chopper in a power circuit connected between a power source and a traction motor comprising
a digital computer mounted on the vehicle,
a plurality of means mounted on the vehicle for providing operator initiated control signals to the computer,
a plurality of means mounted on the vehicle for providing vehicle and power circuit condition signals to the computer,
a random access memory in the computer for storing the operator initiated control signals and the vehicle and power circuit condition signals,
a programable memory in the computer for programing the computer to cyclically compare the values of the stored signals with desired values and to store the comparisons in the random access memory, and
means responsive to selected stored signals and selected comparisons operating within a program stored in the programable memory for providing gating pulses to the electronic circuit.

12. A control system according to claim 11 in which the computer provides the gating pulses and the means for providing gating pulses to the electronic circuit is a gating driver circuit.

13. A system according to claim 12 which includes
a first group of electronic circuits in the power circuit connected for controlling the direction of rotation of the traction motor upon selectively gating some of the electronic circuits of the group, and
means responsive to selected stored signals and selected stored comparisons for providing gating pulses to selected electronic circuits of the first group.

14. A system according to claim 13 which includes means mounted on the vehicle for displaying the values of selected stored signals and selected stored comparisons.

15. A system according to claim 14 in which the display is a group of values for a single cycle and groups are displayed sequentially for a selected number of successive cycles.

16. A system according to claim 13 which includes
an electric motor, in addition to a traction motor, mounted on the vehicle,
a second group of electronic circuits in the power circuit connected to the electric motor, and
means responsive to selected stored signals and selected stored comparisons for providing gating pulses to the second group of electronic circuits whereby the electric motor is connected to the power source through the electronic circuit during startup.

17. A system according to claim 16 which includes
an electric motor, connected to said power circuit, driving auxiliary equipment on the vehicle,
a third group of electronic circuits in the power circuit connected to said motor, and
means responsive to selected stored signals and selected comparisons for selectively providing gating pulses to the third group of electronic circuits for selectively turning said motor on, turning said motor off, accelerating said motor, decelerating said motor, and changing the direction of rotation of the motor.

18. A system according to claim 17 which includes
a capacitor in the power circuit,
a fourth group of electronic circuits connected to the capacitor, and
means responsive to selected stored signals and selected stored comparisons for providing gating pulses to the fourth group of electronic circuits whereby the capacitor is charged upon occurrence of one selected stored signal and discharged upon the occurrence of another stored signal.

19. A system according to claim 18 which includes means mounted on the vehicle for displaying the values of selected stored signals and selected stored comparisons.

20. A system according to claim 19 in which the display is a group of values for a single cycle and groups are displayed sequentially for a selected number of successive cycles.

21. A system according to claim 20 which includes means connected to the computer and responsive to selected stored signals and selected comparisons for inhibiting the gating pulses to selected electronic circuits.

* * * * *